United States Patent [19]

Gulick et al.

[11] Patent Number: 5,448,743
[45] Date of Patent: Sep. 5, 1995

[54] GENERAL I/O PORT INTERRUPT MECHANISM

[75] Inventors: Dale E. Gulick; Joe W. Peterson, both of Austin, Tex.; Munehiro Yoshikawa, Tokyo, Japan; Hiroshi Matsubara, Tokyo, Japan; Toshihiro Fujita, Tokyo, Japan; Kazushige Tsurumi, Tokyo, Japan

[73] Assignee: Advanced Micro Devices, Inc., Sunnyvale, Calif.

[21] Appl. No.: 917,497

[22] Filed: Jul. 21, 1992

[51] Int. Cl.6 .............................. G06F 9/46
[52] U.S. Cl. ..................... 395/869; 364/941; 364/941.7; 364/941.8; 364/DIG. 2; 395/735
[58] Field of Search ............ 395/725, 275, 375; 364/259.7, DIG. 1, 941, 941.8, 941.7, DIG. 2

[56] References Cited

U.S. PATENT DOCUMENTS

| | | |
|---|---|---|
| 3,825,902 | 7/1974 | Brown et al. ............... 395/725 |
| 4,159,516 | 6/1979 | Henrion et al. ............. 395/275 |
| 4,631,670 | 12/1986 | Bradley et al. ............. 395/725 |
| 4,779,195 | 10/1988 | James ....................... 395/275 |
| 4,998,197 | 3/1991 | Kurakazu et al. ........... 395/800 |
| 5,142,625 | 8/1992 | Nakai ....................... 395/275 |

FOREIGN PATENT DOCUMENTS 0358330 3/1990 European Pat. Off. .
61-285545 12/1986 Japan .

*Primary Examiner*—Jack B. Harvey
*Assistant Examiner*—Glenn A. Aure
*Attorney, Agent, or Firm*—Jenkens & Gilchrist

[57] ABSTRACT

An I/O port interrupt mechanism includes a source register connected to the port for reporting sources of interrupts arising within the port, an interrupt mask register connected to the source register and operable to configure the I/O port for generation of interrupts, and an interrupt controller connected to the output of the source register and operable to hold off interrupts arising within the I/O port.

14 Claims, 5 Drawing Sheets

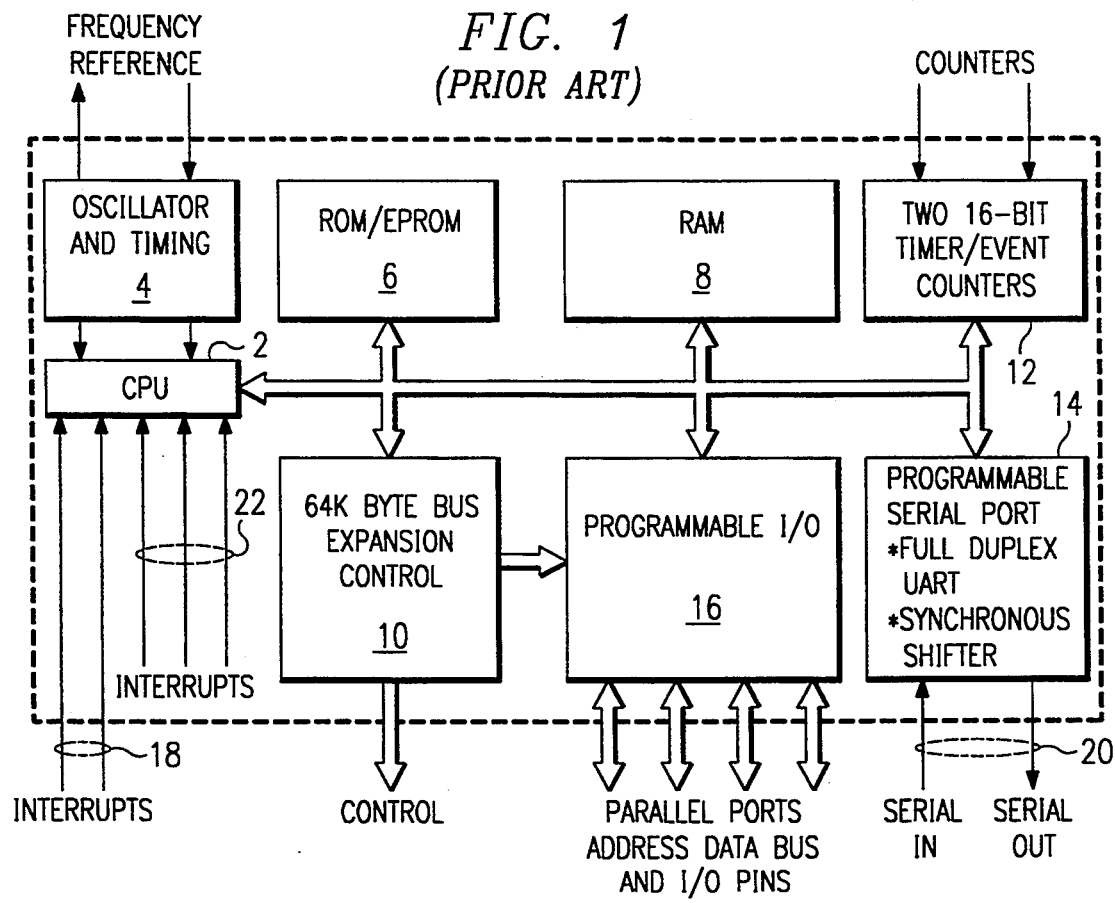
FIG. 1 (PRIOR ART)
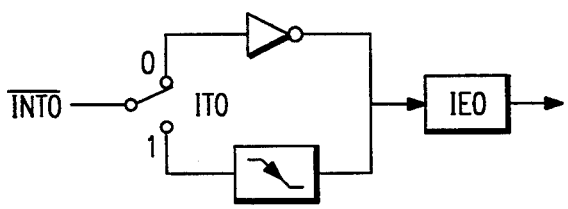
FIG. 3a (PRIOR ART)
FIG. 3b (PRIOR ART)
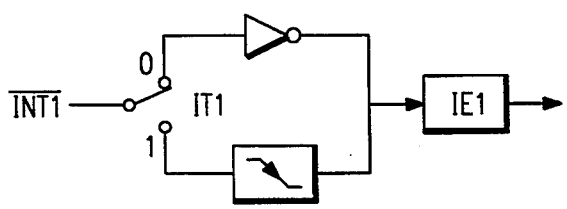
FIG. 3c (PRIOR ART)
FIG. 3d (PRIOR ART)
FIG. 3e (PRIOR ART)

GENERAL I/O PORT INTERRUPT MECHANISM

CROSS-REFERENCE TO RELATED APPLICATIONS

This application is related to the following U.S. patent applications:

| SERIAL NO. | TITLE | INVENTOR(S) |
| --- | --- | --- |
| 07/917,489 | Improved External Memory Access Control for a Processing Unit | Gulick, et al. |
| 07/917,488 | Method of Weak Pull-up Disable and Mechanism Therefor for Use with Microcontroller in Integrated Circuit and Cordless Telephone Using the Integrated Circuit | Bowles, et al. |
| 07/917,503 | Interrupt Mask Disable Circuit and Method | Bowles, et al. |
| 07/918,627 | Integrated Circuit and Cordless Telephone Using the Integrated Circuit | Gulick, et al. |
| 07/918,626 | Modulator Test System | Peterson, et al. |
| 07/918,625 | Keypad Scanner Process and Device and Cordless Telephone Employing the Mechanism | Gulick |
| 07/918,624 | Serial Interface Module and Method | Gulick, et al. |
| 07/918,631 | Low Power Emergency Telephone Mode | Peterson, et al. |
| 07/918,632 | In-Circuit Emulation Capability Mode in Integrated Circuit and Cordless Telephone Using the Integrated Circuit | Gulick, et al. |
| 07/918,622 | Clock Generator Capable of Shut-down Mode and Clock Generation Method | Peterson et al. |
| 07/918,621 | Signal Averager | Gulick |

All of the related applications are filed on even date herewith, are assigned to the assignee of the present invention, and are hereby incorporated herein in their entirety by this reference thereto.

BACKGROUND OF THE INVENTION

1. Field of the Invention

The present invention relates to microprocessors and microcontrollers having an interrupt capability. More specifically, the present invention relates to structure and methods for enhancing the interrupt capability of such microprocessors and microcontrollers.

2. Description of Related Art

Polling of input/output service request flags uses a significant amount of microprocessor or microcontroller time. Polling also reduces system throughput, that is, the total useful information processed or communicated during a specified time period. Therefore, it is advantageous, in terms of increasing throughput, as well as reducing program complexity, if an input/output (I/O) device demands service directly from a microprocessor or a microcontroller. Interrupts provide this capability.

Essentially, an interrupt is a subroutine call initiated by external hardware. When an I/O device requires service, it may set an internal interrupt request flip-flop. Such a flip-flop has its output connected to an interrupt pin of the microprocessor or microcontroller. Thus, the flip-flop stores the I/O device's interrupt request until it is acknowledged by the microprocessor.

The interrupt requests are asynchronous; therefore, they may occur at any point in a program's execution. When an interrupt occurs, the execution of the current instruction is completed, the interrupt is acknowledged by the microprocessor, and control is transferred to a subroutine that services the interrupt (i.e., the service routine is "vectored to"). When the microprocessor or microcontroller responds to the interrupt, the interrupt request flip-flop is cleared by a signal directly from the microprocessor or by a device select pulse generated by the service subroutine. To resume program execution at the proper point when the I/O service subroutine is finished, the program counter is automatically saved before control is transferred to the service subroutine. The service subroutine saves the contents of any registers it uses on the stack, and restores the register's contents before returning. The contents of the program counter, the flag register, the accumulator, and the general purpose registers together represent the state of the microprocessor.

There are two types of interrupt inputs: non-maskable and maskable. When a logic signal is applied to a non-maskable interrupt input, the microprocessor is immediately interrupted. When a logic signal is applied to a maskable interrupt input, the microprocessor is interrupted only if that particular input is enabled. Maskable interrupts are enabled or disabled under program control. If disabled, an interrupt request is ignored by the microprocessor.

A non-maskable interrupt input can be masked externally by an interrupt mask signal from an output port. The mask bit from an output port may gate an interrupt signal. If the output instruction writes a 1 in the mask bit position, the interrupt may be enabled; if it writes a 0, it may be disabled.

In response to an interrupt, the following operations occur:

1. The microprocessor finishes processing the current instruction.
2. An interrupt machine cycle is executed. During this cycle the program counter is saved and control is transferred to an appropriate memory location.
3. The state of the microprocessor is saved.
4. If more than one I/O device is associated with a location transferred to, the highest priority device requesting an interrupt is identified.
5. A subroutine is executed which services the interrupting I/O device. This subroutine clears the interrupt service request flip-flop if it was not cleared in step two.
6. The save state of the microprocessor is restored.
7. Control is returned to the instruction that follows the interrupted instruction.

Each step above requires a certain amount of time. The combined times for a given microprocessor and external interrupt logic determine how quickly the microprocessor responds to an I/O device's request for service.

The time that elapses between the occurrence of the interrupt and the beginning of the execution of the interrupt-handling subroutine is the response time, that is, the sum of the times of steps one through four above. The difference between the total time that the microprocessor is interrupted and the actual execution time of the service subroutine is referred to as overhead. Interrupt structures with low overhead allow greater throughput.

Heretofore, in certain applications using commercially available microcontrollers such as the Intel 8051, there has been a need for a greater number of interrupts than are provided by those products. For example, the Intel 8051 has two external interrupts. In large, integrated systems it is not uncommon for designers to need or to otherwise be able to effectively use more than two interrupts. Heretofore, there has been no inexpensive, easily implemented way to augment or otherwise enhance the interrupt capability of generally available microprocessors and microcontrollers. This lack has been a shortcoming and deficiency of the prior art.

SUMMARY OF THE INVENTION

The present invention overcomes the shortcomings and deficiencies of the prior art by providing an I/O port interrupt mechanism including a source register connected to the port for reporting sources of interrupts arising within the port, an interrupt mask register connected to the source register and operable to configure the I/O port for generation of interrupts, and an interrupt controller connected to the output of the source register and operable to hold off interrupts arising within the I/O port.

In essence, embodiments of the present invention include two sets of mask bits, one in a mask register directly associated with the port, and one in an interrupt controller. The former set is used only to configure the port, the latter set may be used to hold off interrupt for periods of time. Because interrupts are latched in embodiments of the present invention, they are not lost, even when the interrupt generating event occurs during an interrupt "hold off" period.

Accordingly, it is an object of the present invention to provide a mechanism for enhancing the interrupt capability of such conventional microcontrollers as the Intel 8051.

Another object of the present invention is to provide an interrupt mechanism that has minimal hardware and software needs.

Yet another object of the present invention is to provide an interrupt mechanism in which interrupts are not lost.

BRIEF DESCRIPTION OF THE DRAWINGS

Other objects, advantages, and novel features of the present invention will become apparent from the following detailed description of the invention when considered in conjunction with the accompanying drawings in which:

FIG. 1 is a prior art block diagram of the general architectural structure of a microcontroller family;

FIGS. 3a-3e depict interrupt sources in members of the microcontroller family shown in prior art FIGS. 1 and 2;

DETAILED DESCRIPTION OF THE INVENTION

Figure 2:
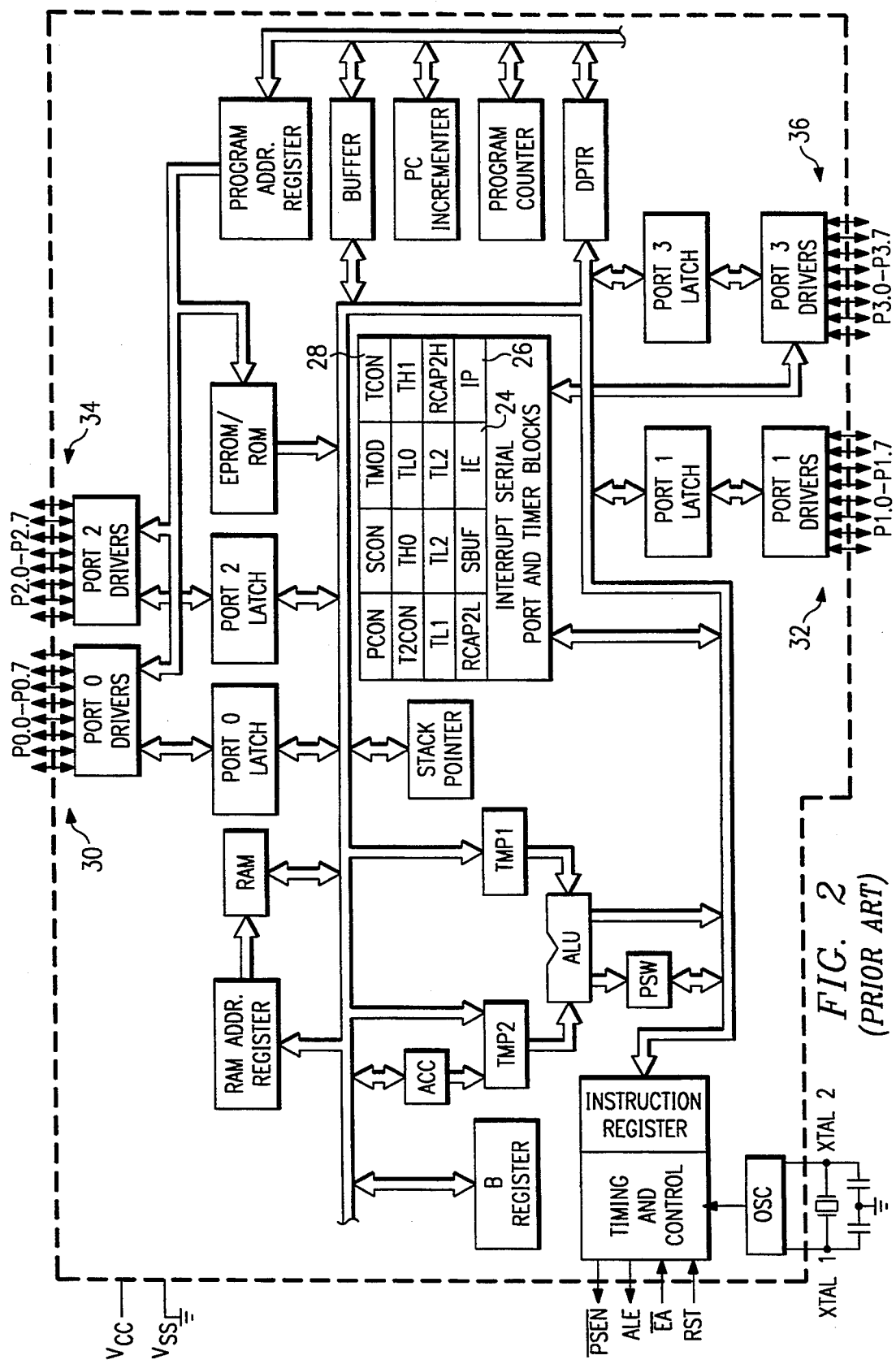
FIG. 2 is a more detailed prior art block diagram of the general structure of the microcontroller family shown in FIG. 1.

Referring now to the drawings and, more particularly, to FIG. 1, there is shown a block diagram of the general architectural structure of the 8051 microcontroller family, a family and a structure that is very familiar to those skilled in the art. Various aspects of this family of microcontrollers are discussed immediately below. Purposes of this discussion are to describe an environment in which the teachings of the present invention may usefully be applied and to provide general background as to operation of prior art microcontrollers; this discussion is not meant to be, nor should it in anyway be construed to be, limiting of the scope of the present invention.

With reference now to FIG. 1, 8051 family products may be seen to include a CPU 2, an oscillator and timing circuit 4, a read-only memory/electrically programmable read-only memory ("ROM/EPROM") 6, a random access memory "RAM" 8, control circuitry 10, timer/-counters 12, a programmable serial port 14, and programmable I/O 16.

The basic 8051 contains 4-kbytes of ROM 6, 128-bytes of RAM 8, two 16-bit timer/counters 12, four programmable 8-bit I/O ports, serial I/O lines 20, and two external interrupt lines 18. The on-chip oscillator and clock circuitry 4 requires an externally connected crystal to operate.

The 8051 has five hardware activated interrupts 18, 22, two of which are external 18. The internal interrupts 22 are generated by timers and the internal serial port. The priority level of interrupts can be predefined. The interrupts can be selectively or globally disabled. The internal timer/counters can be used for measuring pulse widths and time intervals, counting events, and causing periodic interrupts.

The 8051 software program can be written in assembly language using an instruction set consisting of 111 instructions. The instructions are divided into functional groups: arithmetic operations, logic operations, data transfer, Boolean variable manipulation, and program and machine control. For non-time-critical applications the microcomputer is supported by PL/M language.

FIG. 2 shows an even more detailed view of the conventional 8051 microcontroller. Certain elements that play important roles in embodiments of the present invention, which elements are shown in FIG. 2 but not in FIG. 1, include the interrupt enable (IE) register 24, the interrupt priority (IP) register 26, and the timer/-counter control (TCON) register 28.

Referring now to FIG. 3, there is shown the five interrupt sources for a conventional 8051 microcontroller. The external interrupts INT0 and INT1 (shown in FIGS. 3a and 3c) can each be either level-activated or transition-activated, depending on bits IT0 and IT1 in the TCON register (element 28 in FIG. 2). The flags that actually generate these interrupts are bits IE0 and IE1 in TCON. When an external interrupt is generated, the flag that generated it is cleared by the hardware when the service routine is vectored to only if the interrupt was transition-activated. If the interrupt was level-activated, then the external requesting source is what controls the request flag, rather than the on-chip hardware.

Referring now to FIGS. 3b and 3d, the timer 0 and timer 1 interrupts are generated by TF0 and TF1, which are set by a rollover in their respective timer/counter registers. When a timer interrupt is generated, the flag that generated it is cleared by the on-chip hardware when the service routine is vectored to.

Referring now to FIG. 3e, the serial port interrupt is generated by the logical OR of RI and TI. Neither of these flags is cleared by hardware when the service routine is vectored to. In fact, the service routine normally determines whether it was RI or TI that generated the interrupt, and the bit is cleared in software.

In the 8051 family, all of the bits that generate interrupts can be set or cleared by software, with the same result as though it had been cleared by hardware. That is, interrupts can be generated or pending interrupts can be cancelled in software.

Each of the interrupt sources depicted in FIGS. 3a–3e can be individually enabled or disabled by setting or clearing a bit in the special function register IE (element 24 in FIG. 2). The IE register 24 also contains a global disabled bit, EA, which disables all interrupts at once.

As previously mentioned, in addition to having five interrupt lines, only two of which are external, conventional 8051-type microcontrollers also have 32 I/O lines, eight in each of four ports. All four ports (shown connected to programmable input/output circuitry 16 in FIG. 1 and designated with reference numerals 30, 32, 34 and 36 in FIG. 2) are bi-directional. Each port consists of a latch (special function registers P0 through P3), an output driver, and an input buffer. The output drivers of Ports 0 and 2, and the input buffers of Port 0, are used in accesses to external memory. In this application, Port 0 outputs the low byte of the external memory address, time-multiplexed with the byte being written or read. Port 2 outputs the high byte of the external memory address when the address is 16 bits wide. Otherwise, the Port 2 pins continue to emit the P2 special function register ("SRF") contents. All the Port 3 pins are multi-functional. They are not only port pins, but also serve various special functions such as timer/counter external input and timer/counter capture/reload trigger.

As also mentioned above, in the context of a large integrated system such as the cordless telephone application discussed in detail in the cases related hereto, it is desirable to have more interrupts than just the two external interrupts that the conventional 8051 provides. The present invention fills this gap by providing a mechanism that can be added to the microcontroller that allows port pins that have been defined as inputs to generate an interrupt to the microcontroller.

Figure 4:
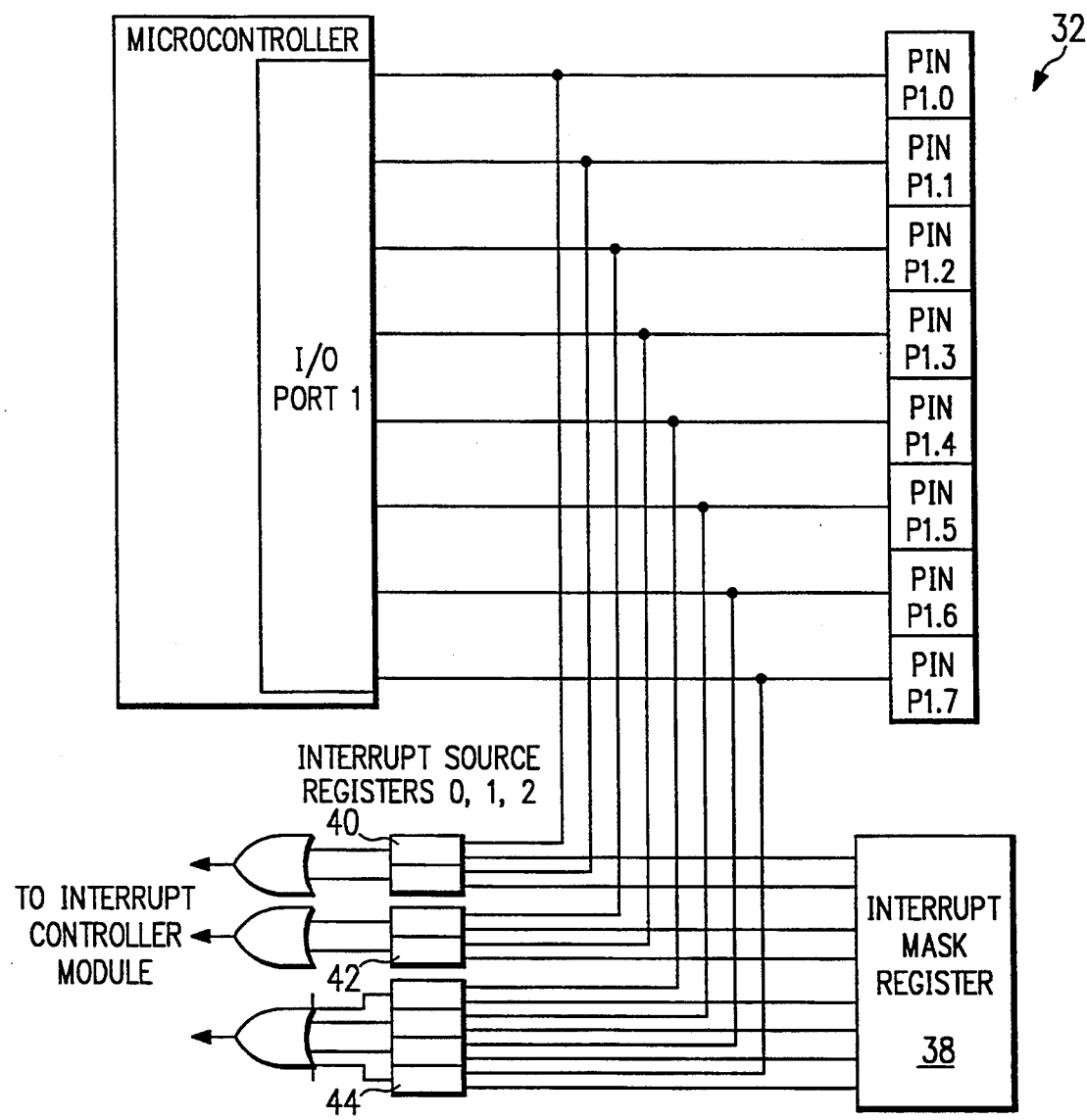
FIG. 4 shows the structure of an interrupt function mechanism according to the teachings of the present invention.

Referring now to FIG. 4, there is shown an embodiment of an interrupt mechanism according to the teachings of the present invention. In general, in the embodiment of the present invention shown in FIG. 4, there are two sets of interrupt masks, one set that is directly associated with the port pins, and one set that is in the interrupt controller module itself.

More specifically, referring to FIG. 4, all eight of the port 1 pins 32, when programmed as inputs, can generate maskable interrupts on edge transitions. As is previously mentioned, the interrupt function implemented in hardware separate from the microcontroller. FIG. 4, in essence, shows the basic structure of the interrupt function.

In the embodiment of the present invention shown in FIG. 4, interrupts are generated on either the rising or falling transition depending on the programming of the port 1 interrupt trigger control register. Selection is on a pin-by-pin basis.

Referring now to interrupt mask register 38 depicted in FIG. 4, a software programmable interrupt enable bit is required for each of the eight inputs. Setting a bit enables interrupt generation from the corresponding input port, clearing the bit blocks interrupt generation. Interrupts are generated only if a transition of the program polarity occurs while the interrupt is enabled. Transitions that occur while the interrupt is masked are not reported if the interrupt is subsequently enabled. It should be noted, however, that this condition is only true of the "local" interrupt mask. If a port 1 interrupt is masked by the main interrupt mask register 1 and the associated interrupt cause is active, that is, if one of the bits is set in the corresponding port interrupt source register, enabling the interrupt at the main interrupt mask register 1 will generate an interrupt. In the embodiment of the present invention depicted in FIG. 4, the local interrupt enable bits are intended to permanently select which pins are capable of generating interrupts. The main mask register is intended to be used to turn off interrupts for a short period of time when software operates to hold off interrupts while a critical task is being performed.

Continuing to refer to FIG. 4, it may be seen that three source registers 40, 42, 44 are provided in the depicted embodiment of the present invention. These registers 40, 42, 44 are for reporting which input port or ports caused an interrupt request to be generated. Two of the registers 40, 42 contain one bit for each of two input ports. The third register 44 contains one bit for each of four input ports. Depending upon the transition selection programmed into the port 1 interrupt trigger control register, a high-to-low or a low-to-high transition of an input pin will set the corresponding interrupt status bit, assuming that the interrupt mask bit is not set. This bit remains set until the register is read by software.

Discussing the general purpose output latch (see FIG. 2) in somewhat more detail, this latch provides eleven general purpose output pins for controlling external functions. In an actually constructed embodiment of the present invention, this is a pair of registers, one a 7-bit register and the other a 4-bit register, residing on the microcontroller data bus. When the bit is set in one of the registers, by software, the corresponding output pin is also set. When the bit is cleared, the pin is cleared. All pins that provide one of the general purpose outputs as their default state, default to a high level.

In the actually constructed cordless telephone into which the present invention is incorporated and which is discussed in great detail in the cases related hereto and incorporated herein, the multiplexing control for all pins except the keypad (OUT 6, 7) and tri-level input (OUT 10) is located in the module where their other functions originate, not in the parallel port module. The keypad and tri-level multiplexing is controlled in the general purpose output register 1.

Figure 5A:
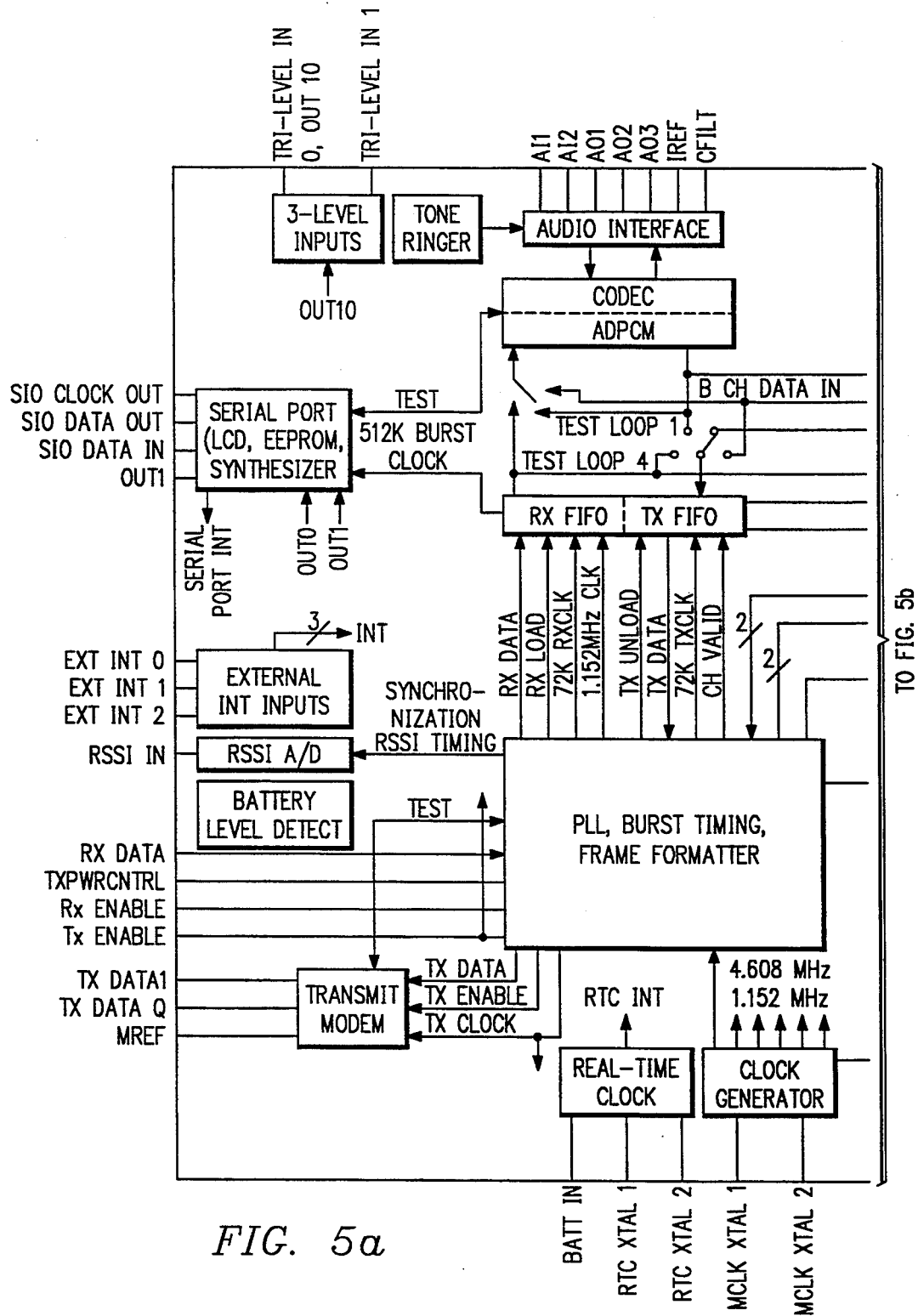
FIG. 5 (which consists of FIGS. 5a and 5b) is a block diagram of an integrated circuit including an interrupt function mechanism according to the teachings of the present invention.
Figure 5B:
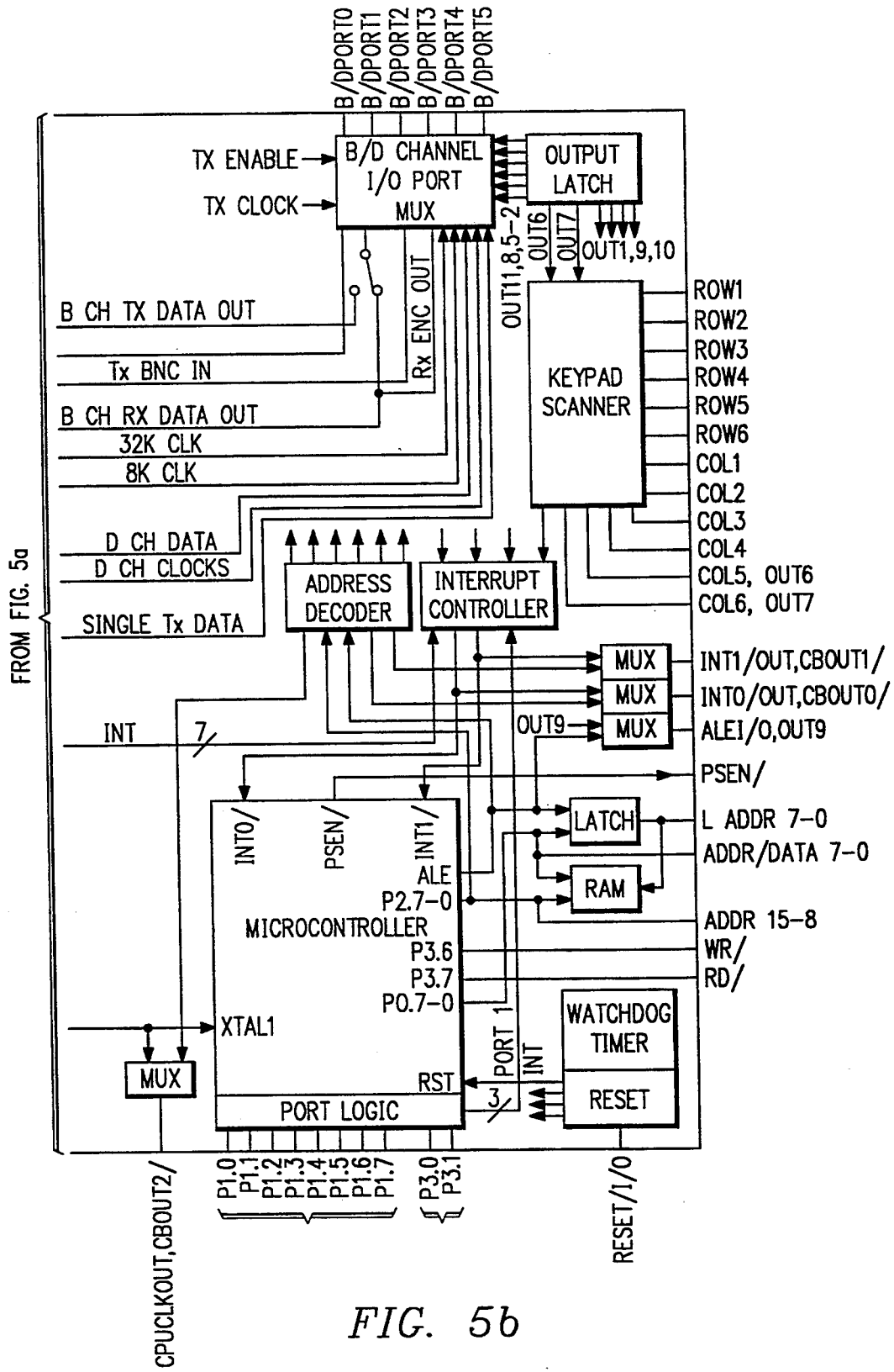

When the parallel I/O port is disabled, via the module enable control register 0 located in the clock generator module (see FIG. 5), all pins that are operating as general purpose outputs are placed in a high impedance state.

Now with respect to the tri-level input port, two pins are provided that can detect three distinct input states: high, low, and open or no connect. The state of the input is generated in the external interrupt status register. The two pins do not generate interrupt requests. The tri-level IN 1 pin is used primarily in the IC used in the actually constructed cordless telephone for selecting the operating modes of the integrated circuit as follows: the state of the tri-level IN 1 pin is monitored by the integrated circuit when reset goes inactive. The IC enters one of the following states:

| TRI 1 | STATE |
| --- | --- |
| Low | ICE |
| Midsupply or no connect | Test mode |
| High | Normal |

After the reset pin goes inactive, the tri-level IN 1 pin can be used as a general input.

With respect to external interrupt input ports in the depicted embodiment of the present invention, three interrupt inputs are provided that generate interrupt requests on both rising and falling transitions. The status of each input pin is reported in a separate one-bit register. If a pin changes states since the last time its status register was read or reset, an interrupt request is latched and sent to the interrupt controller module (see FIG. 5).

Based upon the foregoing, those skilled in the art should now fully appreciate that the interrupt structure depicted in FIG. 4 includes two sets of interrupt masks. As previously mentioned and discussed above, one set is directly associated with the port pins and the other set is in the interrupt controller module itself.

With respect to generating and holding off interrupts, normal practice would be for software to program the mask register that is directly associated with the port pins to configure which pins are to be used to generate interrupts. Further, if that software were to function to hold for interrupts for a certain period of time, it would normally change the mask bits in the interrupt controller and leave the mask bits in the mask register alone. The significance of this is that the mask bits associated with the port pins control whether an interrupting event is latched or not within the interrupt source registers 40, 42, 44 shown in FIG. 4. Thus, only the transitions in the program directions while the mask bits are enabled will be latched.

In embodiments of the present invention, only the mask bits in the interrupt controller itself are used to hold off interrupts. Therefore, in embodiments of the present invention, an interrupt that occurs while the mask bit in the interrupt controller is disabled will latch within the parallel port structure depicted in FIG. 4, and can be registered at the microcontroller once software re-enables the interrupt controller. This would not be the case if an interrupting event occurred if and when the mask register associated with the ports was disabled. In that case, the interrupt would be lost.

Thus, it should be understood that, generally, in embodiments of the present invention the interrupt mask at the parallel port is used only to configure the port and the interrupt mask in the interrupt controller is used to hold off the interrupts, if desired.

Further, with respect to embodiments of the present invention, it should be appreciated that breaking the eight possible interrupts into three separate groups 40, 42, 44 simplifies software reporting. Still further, the fact that software can readily effect generation of interrupts on either rising or falling transitions in embodiments of the present invention should be perceived as a positive feature and advantage thereof.

Based upon all of the foregoing, those skilled in the art should now fully appreciate and understand the structure, operation, and advantages of embodiments of the present invention. The present invention provides a parallel port interrupt structure including two sets of interrupt mask bits, one in a mask register directly associated with the parallel port pins and the other in the interrupt mask controller. The former set is used only to configure the port pins; the latter may be employed to hold off interrupts. Interrupt source registers are also provided, between the two sets of mask bits. This division of labor ensures that interrupts are not lost during hold off periods, but rather the interrupts remain latched in the interrupt source registers until they are read to the microcontroller so that an appropriate action may be taken. Those skilled in the art should also appreciate that the present invention uses minimal hardware and software to provide the advantages that it does.

Obviously, numerous modifications and variations are possible in view of the teachings above. Accordingly, within the scope of the appended claims, the present invention may be practiced otherwise than as specifically described herein.

What is claimed is:

1. A microcontroller I/O port interrupt mechanism having a microcontroller I/O port comprising a plurality of port pins, said mechanism comprising:
    at least one source register operatively connected to said I/O port for reporting sources of interrupts arising within said I/O port, said reporting accomplished via an output signal;
    an interrupt mask register directly connected to said at least one source register, said interrupt mask register containing a set of mask bits which may be set to configure said plurality of port pins; and
    an interrupt controller connected to receive said output of said at least one source register, said interrupt controller containing a set of mask bits which may be set to hold off interrupts arising within said I/O port,
    wherein there are eight port pins, and wherein there are three interrupt source register, each said interrupt source register being at least one bit in length, and
    wherein two of said three interrupt source registers contain one bit for each of two port pins, and wherein the third of said three interrupt source registers contains one bit for each of four port pins.

2. A mechanism as recited in claim 1, wherein interrupts are generated on edges of transitions, and further comprising a control register operatively connected to said I/O port, which control register is programmable to cause generation of interrupts on selectable edges of transitions.

3. A mechanism as recited in claim 2, wherein said control register comprises means for causing generation of interrupts on selectable edges of transitions on a port pin-by-port pin basis.

4. A microcontroller I/O port interrupt mechanism having a microcontroller I/O port comprising a plurality of port pins, said mechanism comprising:
    at least one source register operatively connected to said I/O port for reporting sources of interrupts arising within said I/O port, said reporting accomplished via an output signal;
    an interrupt mask register directly connected to said at least one source register, said interrupt mask register containing a set of mask bits which may be set to configure said plurality of port pins; and an interrupt controller connected to receive said output of said at least one source register, said interrupt controller containing a set of mask bits which may be set to hold off interrupts arising within said I/O port, wherein interrupts are generated on edges of transitions, and further comprising a control register operatively connected to said I/O port, which control register is programmable to cause generation of interrupts on selectable edges of transitions, wherein said control register comprises means for causing generation of interrupts on selectable edges of transitions on a port pin-by-port pin basis, and wherein said edge transitions comprise rising edges and falling edges, and wherein three interrupt inputs are programmably provided to generate interrupt requests on both rising and falling transitions.

5. A mechanism as recited in claim 4, wherein three distinct input states are possible, and wherein two pins are capable of detecting said three distinct input states.

6. A mechanism as recited in claim 5, wherein said three distinct input states are high, low, and open.

7. A microcontroller I/O port interrupt mechanism having a microcontroller I/O port comprising a plurality of port pins, said mechanism comprising:

at least one source register operatively connected to said I/O port for reporting sources of interrupts arising within said I/O port, said reporting accomplished via an output signal;

an interrupt mask register directly connected to said at least one source register, said interrupt mask register containing a set of mask bits which may be set to configure said plurality of port pins; and an interrupt controller connected to receive said output of said at least one source register, said interrupt controller containing a set of mask bits which may be set to hold off interrupts arising within said I/O port, wherein said interrupt mask register and said interrupt controller are separate and distinct elements, and wherein said set of mask bits contained by said interrupt mask register is separate and distinct from said set of mask bits contained by said interrupt controller.

8. A mechanism as recited in claim 7, wherein there are eight port pins, and wherein there are three interrupt source registers, each said interrupt source register being at least one bit in length.

9. A mechanism as recited in claim 8, wherein two of said three interrupt source registers contain one bit for each of two port pins, and wherein the third of said three interrupt source registers contains one bit for each of four port pins.

10. A mechanism as recited in claim 7, wherein interrupts are generated on edges of transitions, and further comprising a control register operatively connected to said I/O port, which control register is programmable to cause generation of interrupts on selectable edges of transitions.

11. A mechanism as recited in claim 10, wherein said control register comprises means for causing generation of interrupts on selectable edges of transitions on a port pin-by-port pin basis.

12. A mechanism as recited in claim 11, wherein said edge transitions comprise rising edges and falling edges, and wherein three interrupt inputs are programmably provided to generate interrupt requests on both rising and falling transitions.

13. A mechanism as recited in claim 12, wherein three distinct input states are possible, and wherein two pins are capable of detecting said three distinct input states.

14. A mechanism as recited in claim 13 wherein said three distinct input states are high, low, and open.

* * * * *